United States Patent
Prasad

(10) Patent No.: US 7,132,152 B2
(45) Date of Patent: Nov. 7, 2006

(54) FLEXIBLE BARRIER FILM STRUCTURE

(75) Inventor: Ravi Prasad, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 152 days.

(21) Appl. No.: 10/346,528

(22) Filed: Jan. 17, 2003

(65) Prior Publication Data

US 2003/0134097 A1 Jul. 17, 2003

Related U.S. Application Data

(63) Continuation-in-part of application No. 09/702,236, filed on Oct. 30, 2000.

(51) Int. Cl.
*B32B 7/02* (2006.01)
*B32B 9/04* (2006.01)
*C09K 19/00* (2006.01)

(52) U.S. Cl. .................. 428/212; 428/1.5; 428/213; 428/214; 428/411.1; 428/480; 347/86; 347/87

(58) Field of Classification Search .......... 428/212, 428/411.1, 423.7, 475.2, 1.5, 480, 213, 214; 347/86, 87
See application file for complete search history.

(56) References Cited

U.S. PATENT DOCUMENTS

| 5,656,714 | A | | 8/1997 | Shen et al. | |
| 5,942,297 | A | | 8/1999 | Speer et al. | |
| 5,975,686 | A | | 11/1999 | Hauck et al. | |
| 6,015,524 | A | | 1/2000 | Kuder et al. | |
| 6,146,764 | A | * | 11/2000 | Suokas et al. | 428/412 |
| 6,268,026 | B1 | * | 7/2001 | Jester et al. | 428/1.6 |
| 6,312,772 | B1 | * | 11/2001 | Kuder et al. | 428/1.5 |
| 6,333,086 | B1 | | 12/2001 | Ora et al. | |
| 6,426,128 | B1 | * | 7/2002 | Kimmel et al. | 428/1.6 |

* cited by examiner

*Primary Examiner*—Rena Dye
*Assistant Examiner*—Lawrence Ferguson

(57) ABSTRACT

A barrier film for separating liquid and air, including a liquid crystalline polymer layer having a glass transition temperature less than about 115° C., and having a thickness less than about 15 microns. The barrier film further including a heat-sealable layer, and an adhesive layer interposed between the liquid crystalline polymer layer and the heat sealable layer, forming the barrier film.

25 Claims, 2 Drawing Sheets

FLEXIBLE BARRIER FILM STRUCTURE

CROSS REFERENCE TO RELATED APPLICATIONS

This application is a continuation in part of U.S. application Ser. No. 09/702,236, filed on Oct. 30, 2000, entitled Flexible Barrier Film Structure.

BACKGROUND

Description of the Art

Ink-jet technology is employed in hard-copy-producing devices such as computer printers, graphics plotters and facsimile machines. By way of background, a description of ink-jet technology is provided in various articles in the Hewlett-Packard Journal such as those in the following editions: Vol. 36, No. 5 (May 1985), Vol. 39, No. 4 (August 1988), Vol. 39, No. 5 (October 1988), Vol. 43, No. 4 (August 1992), Vol. 43, No. 6 (December 1992) and Vol. 5, No. 1 (February 1994).

Barrier films are used in several aspects of ink-jet technology including to form: (1) bags for containing air for use in a pressure regulator such as that described in U.S. Pat. No. 5,975,686 to Hauck et al.; and (2) bags for containing ink, also referred to as ink-containment devices, such as those described in pending U.S. patent application Ser. No. 08/869,446 to Olsen et al. Both of the above-identified patent and pending patent applications are incorporated herein by reference. For ink-containment applications, the ink-containment device may be part of a disposable printer cartridge or it may be part of a so-called off-axis supply of ink.

In either of the two above-identified applications for barrier films, one of the functions of the barrier film is to provide effective separation of air and ink. In the pressure regulator application, the bag actuates the pressure regulator by expanding and contracting as a function of back pressure that exists in an ink accumulator associated with the pressure regulator and ambient pressure that is communicated through a suitable vent formed in the pressure regulator. To function, the bag must be flexible and must exhibit effective chemical stability to ink or other volatile liquid writing media. If the bag is not flexible, it will not actuate the pressure regulator.

In addition, if the bag is not stable in an ink environment, it will allow air to permeate through it. When this occurs, the bag will no longer provide for pressure regulation. To provide pressure regulation, the barrier film forming the bag must stop air from coming into the ink. If it allows air to come into the ink, then there will no longer be the desired differential pressure that prevents many unwanted events such as variations in print density and print quality, dripping of ink at the ink-jet pen nozzle, and depriming of the print cartridge.

For ink-containment devices, the barrier film must again separate air and ink to prevent the ink from drying out as it is a volatile writing medium. As a result, there is a continuing need to develop barrier films that provide desired, long term separation of air and ink so that ink-containment devices have a correspondingly long shelf life. None of the known prior art ink-containment devices provides for the secure containment of ink against the possibility of ink leakage during long-term storage, normal use or accidental shock or other trauma to the container.

There have been many conventional proposals for barrier films and those proposals have included use of the following chemical compounds as barrier layers within a composite film: (1) PVDC (polyvinylidene chloride—a DOW version is sold under the trademark SARAN and SARANEX); (2) PVDF (polyvinylidene fluoride—a commercial version is sold under the trademark KYNAR); (3) EVOH (ethylene-vinyl alcohol copolymer); (4) metal films such as aluminum, silicon oxide or silicon dioxide; (5) ECTFE (ethylene chlorotrifluoroethylene copolymer); (6) PCTFE (polychlorotrifluoroethylene polymer); and CVD diamond-like coated films (where CVD refers to a chemical vapor deposition process).

For either the pressure-regulator or the ink-containment device application, the barrier film structure must exhibit the following characteristics: flexibility, strength, and fluid-impermeability where the fluid may be ink, other printable liquid writing media, air, or other gases.

DESCRIPTION OF THE PREFERRED EMBODIMENTS

The flexible barrier film structure of the present invention is one for use in devices such as for example a fluid ejection cartridge to separate a fluid and air. The flexible film structure includes a film body formed of plural layers, wherein a first layer is formed as a liquid crystalline polymer (LCP), and wherein the film body exhibits a flexibility of less than about 6 grams force (gf) according to conventional film flexibility testing methods. The presently preferred use of the invention is in a five-layer flexible film as follows: heat-sealable layer/tie layer/LCP/tie layer/heat-sealable layer. The tie layer may also be thought of as an adhesive layer.

Preferably the LCP is formed with a thickness of in the range of about 5–10 microns, however in alternate embodiments a thickness less than about 15 microns may also be used. Each tie layer is formed with a thickness in the range of about 3–10 microns, and each heat-sealable layer is formed with a thickness in the range of about 5–15 microns. Suitable materials for the tie layer include a terpolymer sold under the trademark LOTADER 8900, and for the heat-sealable layer include LDPE, MDPE or HDPE (low-mediumor high-density polyethylene). Flexibility of the overall film structure is optimized by using LDPE as well as by varying the thickness of the LCP layer with thinner LCP layers providing greater flexibility.

The surprising result of the invention is that LCP, a material thought to be unacceptably stiff for the above-described barrier film applications, is actually a substantially flexible material when formed in a thickness range of less than about 15 microns and more preferably when formed in a thickness range of 5–10 microns. In general, LCP exhibits a flexural modulus about 3–5 times higher than other polymers that are candidates for use in barrier film applications. However, according to the present invention, suitably thin LCP layers formed in multi-layer barrier film structure exhibit excellent flexibility and chemical stability to ink.

Figure 1:
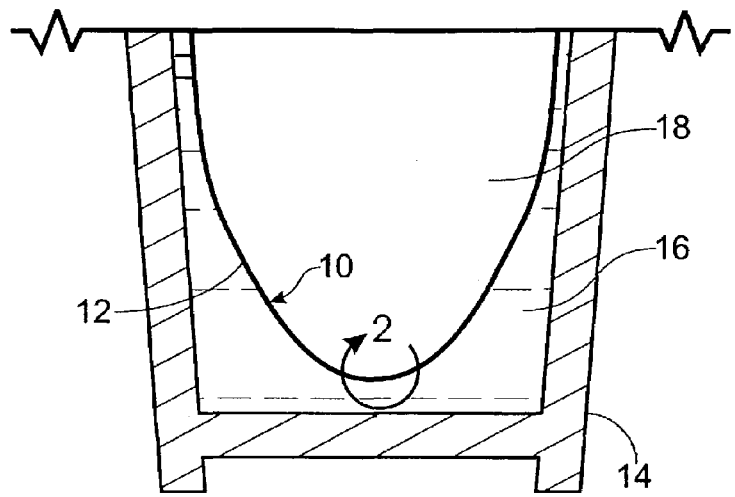
FIG. 1 is a fragmentary, sectional view of a pressure regulator of an fluid ejection cartridge including a flexible barrier film structure according to an embodiment of the present invention.

These and additional objects and advantages of the present invention will be more readily understood after consideration of the drawings and the detailed description of the preferred embodiment which follows. Referring to FIG. 1, an exemplary embodiment of the present invention is shown as part of a pressure regulator for a fluid ejection cartridge utilized as an ink-jet pen and is similar to the regulator described in U.S. Pat. No. 5,975,686 to Hauck et al. For purposes of this description, and particularly for further details of the need for back pressure in ink-jet printers, applicant also incorporates by reference the teachings of U.S. Pat. No. 5,736,992 to Pawloski, Jr.

Still referring to FIG. 1, flexible barrier film structure 10 is formed as a bag 12 which is located in a pressure regulator 14 which contains a volatile liquid writing medium such as ink 16. Bag 12 contains air 18 and functions to provide back pressure in an amount effective to prevent the above-identified undesired effects such as dripping of ink at the ink-jet pen nozzle (not shown). The presently preferred process for forming film structure 10 is by using conventional co-extrusion equipment, following the usual requirements for processing the material prior to co-extrusion. In addition, in alternate embodiments, many other processes for forming a bag made of a multi-layer film structure may also be utilized to form bag 12 from flexible barrier film structure 10; such as, for example, lamination.

Figure 2:
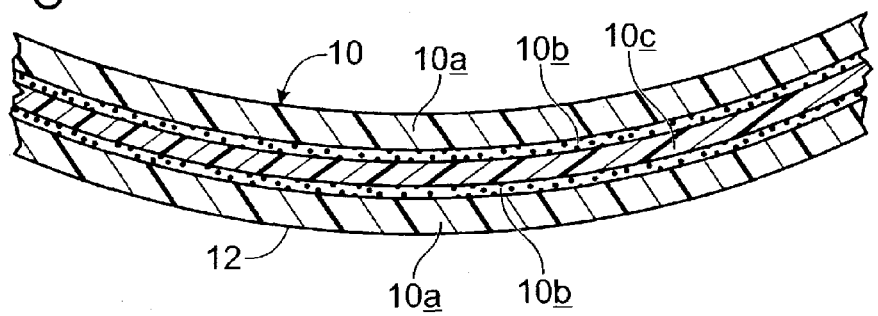
FIG. 2 is an enlarged, fragmentary, sectional view of the flexible barrier film structure encircled by circle-2 of FIG. 1 according to an embodiment of the present invention.

Referring to FIG. 2, an enlarged section of flexible barrier film structure 10 shows that it is formed of five layers as follows: two outer layers 10a, two adhesive layers 10b that each bond one of outer layers 10a to opposite sides of a core layer 10c. Outer layers 10a are made from a heat-sealable material such as low-, mediumor high-density polyethylene (also referred to as LDPE, MDPE and HDPE, respectively). As noted above, the flexibility of flexible barrier film structure 10 may be optimized by using LDPE as well as by varying the thickness of the LCP layer with thinner LCP layers providing greater flexibility. Adhesive layers 10b may be formed of any suitable adhesive such as an adhesive marketed under the trademark LOTADER 8900 by Elf Atochem Inc.

Core layer 10c is formed of a liquid crystalline polymer such as that marketed under the name VECTRA by Ticona Inc. In this embodiment, the liquid crystalline polymer layer, forming core layer 10c, is an aromatic polyester layer having recurring monomer units derived from terephthalic acid, 6-hyrdoxy-2-naphthoic acid, p-hydroxybenzoic acid, 4,4'-biphenol, and resorcinol. In this embodiment, for every 100 moles of the recurring monomer units the aromatic polyester includes 30–35 moles of p-hydroxybenzoic acid units, 35–40 moles of 6-hyrdoxy-2-naphthoic acid units, 15 moles of terephthalic acid units, 10 moles of 4,4'-biphenol units, and 5 moles of resorcinol units. In alternate embodiments, for every 100 moles of the recurring monomer units the aromatic polyester includes 20–40 moles of p-hydroxybenzoic acid units, 10–40 moles of 6-hyrdoxy-2-naphthoic acid units, 15–30 moles of terephthalic acid units, 5–20 moles of 4,4'-biphenol units, and 5–20 moles of resorcinol units may also be utilized. In still other embodiments, other liquid crystalline polymers having other monomer units may also be utilized.

The liquid crystalline polymer, forming core layer 10c, has a glass transition temperature in the range from about 100° C. to about 108° C. In alternate embodiments, liquid crystalline polymer layers having a glass transition temperature in the range from about 80° C. to about 115° C. may also be utilized. In addition, the liquid crystalline polymer, forming core layer 10c, has a melt viscosity of at least 500 poise, however, in alternate embodiments a liquid crystalline polymer having a melt viscosity of at least 300 poise, at a shear rate of 1000 reciprocal seconds measured at 230° C. in a capillary rheometer using an orifice 1 mm in diameter and 30 mm long. Thus, by utilizing a core layer having a glass transition temperature in substantially the same range as either the glass transition or melting temperatures of the heat sealable and tie layers, co-extrusion may be utilized to form multi-layered film structure 10. The co-extrusion process includes combining the liquid crystalline polymer, the heat sealable polymer, and the adhesive polymer in a molten state in an extrusion die head and extruded through a slit to yield a multi-layered film. By utilizing a co-extrusion process thinner layers of each material may be utilized to form a thinner overall thickness than that obtained by conventional lamination processes.

Still referring to the multi-layer illustration in FIG. 2, preferred thicknesses and thickness ranges for each layer is as follows: (1) each outer layer 10a preferably has a thickness of about 10 microns and is within a thickness range of about 5–15 microns; (2) each adhesive layer 10b preferably has a thickness of about 5 microns and is within the thickness range of about 3–10 microns; and (3) core layer 10c preferably is about 5 microns thick and is within a thickness range of about 5–10 microns and may be less than 15 microns thick. To maintain the desired flexibility feature described below, it has been found that core layer 10c at a thickness of less than 10 microns is optimal Another way to characterize flexible barrier film structure 10 is to start first with core layer 10c and refer to it as a first layer. Next, adhesive layer 10b could be thought of as a second layer and outer layer 10c could be thought of as a third layer.

The presently preferred embodiment of film structure 10 is to form it as bag 12 for use in association with a pressure regulator for an ink-jet container, and to form film structure 10 in the following pattern of five layers: heat-sealable layer/adhesive layer/LCP/adhesive layer/heat-sealable layer. Preferably, each heat-sealable layer is LDPE, each adhesive layer is LOTADER 8900 adhesive, and the LCP is the one sold under the trademark VECTRA by Ticona.

Figure 3:
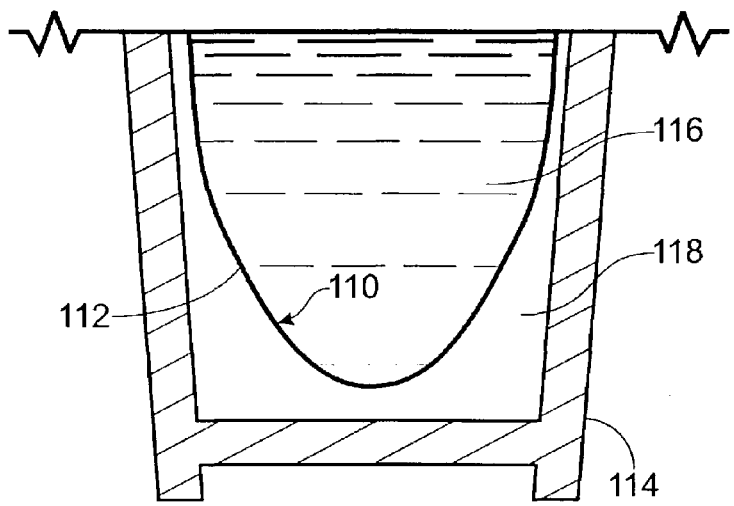
FIG. 3 is a fragmentary, sectional view of an ink containment device associated with an ink-jet printer according to an alternate embodiment of the present invention.

Referring to FIG. 3, another embodiment of the invention is shown as flexible barrier film structure 110 formed as a bag 112 located in a container 114. Bag 112 contains ink 116 and there is air 118 in that volume of the container that is not taken up by bag 112. Except for film structure 110, the construction of bag 112 such as its configuration may be like any known ink containment bag. Likewise, container 114 may be any known associated container.

Referring to both FIGS. 1 and 3, flexible barrier film structure 10/110 effectively prevents undesired air/ink interaction. In the case of the pressure regulator application shown and described in FIG. 1, film structure 10 stops air from coming into the ink so that the desired differential pressure is maintained as described above. In the case of the ink-containment device shown in FIG. 3, film structure 110 prevents air from entering bag 112 which would cause ink 116 to dry up. In addition, if air diffuses into the ink and saturates the ink, when the ink is placed under negative pressure in an ink-containment device with a printhead, the air comes out of the saturated ink solution and becomes trapped within the ink delivery system to the printhead. Over time this accumulated trapped air displaces the ink within the ink delivery system and prevents proper pressure regulation within the printhead.

Referring again to FIG. 2, first layer/core layer 10c surprisingly provides the necessary flexibility for either application shown in FIG. 1 or 3. The LCP that forms first layer 10c exhibits a flexibility of 6 gram force according to conventional film flexibility test procedures. In addition, first layer 10c provides improved chemical stability in ink or in other volatile liquid writing media. Conventional permeability testing of film structure 10/110 gave consistently low values indicating that the film structure does not degrade in an ink environment. For example, following the standard oxygen permeation testing provided by Mocon Corporation, superior barrier results were obtained for film structure 10/110 that had been soaked in ink-jet inks according to the usual test methods. Following that known testing, film structure 10/110 outperformed various conventional barrier films including ones formed with a PVDC layer using the material marketed by DOW Corporation under the trademark SARANEX 11.

Figure 4:
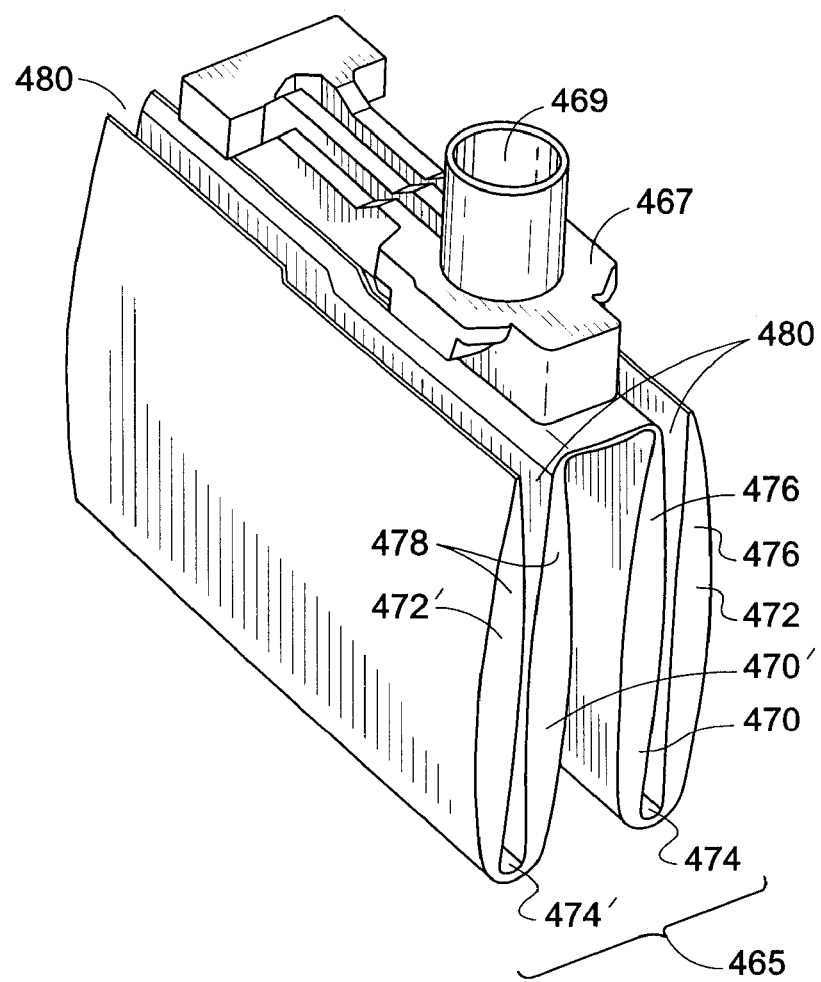
FIG. 4 is a perspective view of a fluid ejection cartridge regulator including a flexible barrier film structure according to an alternate embodiment of the present invention.

Referring to FIG. 4, an alternate embodiment of a barrier film of the present invention utilized in a pressure regulator is shown in a perspective view. In this embodiment, flexible bag 465 is staked to fitment 467 that is preferably press-fit into a crown which forms the bottom portion or fluid delivery portion of an inkjet cartridge container. The crown and ink-jet cartridge container are made from a thermoplastic polymer utilizing conventional injection molding equipment. Fitment 467 includes vent 469 to ambient pressure in the shape of a helical, labyrinth path. Vent 469 connects to, and is in fluid communication with, the inside of flexible bag 465, so that flexible bag 465 is maintained at a reference pressure. The helical path reduces the diffusion of fluid out of the fluid container via diffusion through flexible bag 465. In this embodiment flexible bag 465 is formed from film body 10. Flexible bag 465 include first section 470, second section 472 and folding section 474 forming a folded structure having at least one fold. First section 470 and second section 472 are substantially parallel to each other with the three sections 470–474 forming a U shaped structure. Such a folded bag structure may be analogized to a bellows like structure. As the folded sections inflate the two sections push on each other expanding against the levers (not shown) of the regulator. In addition, as flexible bag 465 expands and contracts (i.e. inflates and deflates) the contact area to the levers remains substantially constant, providing a substantially linear response to pressure changes. Cutting a sheet of flat film, having the multi-layered structure shown in FIG. 2 and described above, to the desired size forms flexible bag 465. The flat film is staked to fitment 467 and then a hole is formed in the film that mates, or fluidically couples, with vent 469 to allow air to pass through vent 469 to the inside of flexible bag 465. The flat film is then folded in half and staked around the perimeter using heat and pressure applied to the outer edges of the film, forming first lung 476 and second lung 478. First lung 476 and second lung 478 are then folded forming a flexible folded bag as described above. In alternate embodiments corners 480 may be staked or tacked. Flexible bag 465 may then be inserted into an ink-jet cartridge container.

The invented system has broad applicability in connection with flexible barrier films for hard-copy-producing devices, and has more particular applicability to ink-jet or other fluid controlled printers which require flexible barrier films to form air bags used in association with pressure regulators and to form ink-containment devices for holding ink or other fluids in disposable printer cartridges and in off-axis supplies of ink or fluids. Air bags for use with ink-jet pressure regulators made from the flexible barrier film structure of the present invention have proven themselves reliably and securely to maintain separation from air and ink, and to exhibit the flexibility required to function as an expandable/contractible bag that actuates the pressure regulator to maintain a desired pressure differential between back pressure that exists in an ink accumulator associated with the pressure regulator and ambient pressure. The invented system is inexpensively manufactured using existing tools, dies and assembly processes and equipment.

Accordingly, while the present invention has been shown and described with reference to the foregoing preferred embodiments, it will be apparent to those skilled in the art that other changes in form and detail may be made therein without departing from the spirit and scope of the invention as defined in the appended claims.

What is claimed is:

1. A barrier film for separating liquid and air, comprising:
    a liquid crystalline polymer layer having a glass transition temperature in the range from about 80° C. to about 115° C., and having a thickness less than about 15 microns;
    a heat-sealable layer; and
    an adhesive layer interposed between said liquid crystalline polymer layer and said heat sealable layer, forming the barrier film.

2. The barrier film in accordance with claim 1, wherein the barrier film is formed by co-extruding said liquid crystalline polymer layer, said heat sealable layer, and said adhesive layer.

3. The barrier film in accordance with claim 1, wherein said liquid crystalline polymer layer, said heat sealable layer, and said adhesive layer have a glass transition temperature or melting temperature in substantially the same range.

4. The barrier film in accordance with claim 1, wherein said liquid crystalline polymer layer further comprises an aromatic polyester polymer.

5. The barrier film in accordance with claim 4, wherein said aromatic polyester polymer further comprises recurring monomer units derived from terephthalic acid, 6-hyrdoxy-2-naphthoic acid, p-hydroxybenzoic acid, 4,4'-biphenol, and resorcinol.

6. The barrier film in accordance with claim 5, wherein for every 100 moles of said recurring monomer units in said liquid crystalline polymer layer, said liquid crystalline polymer layer further comprises 20–40 moles of p-hydroxybenzoic acid units, 10–40 moles of 6-hyrdoxy-2-naphthoic acid units, 15–30 moles of terephthalic acid units, 5–20 moles of 4,4'-biphenol units, and 5–20 moles of resorcinol units.

7. The barrier film in accordance with claim 5, wherein for every 100 moles of said recurring monomer units in said liquid crystalline polymer layer, said liquid crystalline polymer layer further comprises 30–35 moles of p-hydroxybenzoic acid units, 35–40 moles of 6-hyrdoxy-2-naphthoic acid units, 15 moles of terephthalic acid units, 10 moles of 4,4'-biphenol units, and 5 moles of resorcinol units.

8. The barrier film in accordance with claim 1, wherein said glass transition temperature of said liquid crystalline polymer layer is in the range from about 100° C. to about 108° C.

9. The barrier film in accordance with claim 1, wherein said liquid crystalline polymer layer has a melt viscosity of at least 500 poise, at a shear rate of 1000 reciprocal seconds measured at 230° C.

10. The barrier film in accordance with claim 1, wherein said liquid crystalline polymer layer has a melt viscosity of at least 300 poise, at a shear rate of 1000 reciprocal seconds measured at 230° C.

11. The barrier film in accordance with claim 1, wherein the barrier film exhibits a flexibility of less than about 6 grams force.

12. The barrier film in accordance with claim 1, further comprising:
   a second heat sealable layer; and
   a second adhesive layer bonded to said second heat sealable layer and said liquid crystalline polymer layer.

13. The barrier film in accordance with claim 12, wherein said second heat sealable layer and said heat sealable layer are formed of the same material bonded to opposing sides of said liquid crystalline polymer layer.

14. The barrier film in accordance with claim 1, wherein said thickness of said liquid crystalline layer further comprises a thickness in the range from about 5 microns to about 10 microns.

15. The barrier film in accordance with claim 1, wherein said thickness of said liquid crystalline layer further comprises a thickness of about 5microns.

16. The barrier film in accordance with claim 1, wherein said adhesive layer has a thickness in the range from about 3 microns to about 10 microns.

17. The barrier film in accordance with claim 1, wherein said heat sealable layer has a thickness in the range from about 5 microns to about 15 microns.

18. The barrier film in accordance with claim 1, wherein said heat sealable layer is formed of a material selected from the group consisting of low-density, medium-density, high-density polyethylene and combinations thereof.

19. A fluid ejection cartridge regulator comprising at least one lung including a flexible bag, said flexible bag including a folded structure having at least one fold, and said flexible bag formed from the barrier film of claim 1.

20. The fluid ejection cartridge regulator in accordance with claim 19, wherein said folded structure further comprises a first section, a second section, and a folding section, wherein said second section is folded back and substantially parallel to said first section, whereby a U shaped structure is formed.

21. A barrier film for separating a liquid and air, comprising:
   an aromatic polyester layer having recurring monomer units derived from terephthalic acid, 6-hyrdoxy-2-naphthoic acid, p-hydroxybenzoic acid, 4,4'-biphenol, and resorcinol, said aromatic polyester layer having a glass transition temperature in the range from about 80° C. to about 115° C., and having a thickness less than about 15 microns;
   a heat-sealable layer; and
   an adhesive layer, having a melting point less than about 110° C., interposed between said aromatic polyester layer and said heat sealable layer, forming the barrier film by co-extruding said aromatic polyester layer, said heat sealable layer, and said adhesive layer, wherein the barrier film exhibits a flexibility of less than about 6 gram force.

22. A flexible barrier film for separating liquid and air, comprising:
   a liquid crystalline polymer layer having a glass transition temperature in the range from about 80° C. to about 115° C. and having a thickness less than about 15 microns;
   a heat-sealable layer having a thickness in the range from about 5 microns to about 15 microns; and
   an adhesive layer interposed between said liquid crystalline polymer layer and said heat sealable layer, forming the flexible barrier film.

23. The flexible barrier film in accordance with claim 22, wherein said liquid crystalline polymer layer further comprises said liquid crystalline polymer layer having a glass transition temperature in the range from about 80° C. to about 115° C.

24. The flexible barrier film in accordance with claim 22, wherein said adhesive layer further comprises a terpolymer adhesive.

25. The flexible barrier film in accordance with claim 22, wherein said liquid crystalline polymer layer, said heat sealable layer, and said adhesive layer all have a glass transition temperature or melting temperature in substantially the same range.

* * * * *

UNITED STATES PATENT AND TRADEMARK OFFICE
CERTIFICATE OF CORRECTION

PATENT NO.         : 7,132,152 B2
APPLICATION NO.  : 10/346528
DATED                 : November 7, 2006
INVENTOR(S)        : Ravi Prasad It is certified that error appears in the above-identified patent and that said Letters Patent is hereby corrected as shown below:

In column 3, line 53, delete "hyrdoxy" and insert -- hydroxy --, therefor.

In column 3, line 57, delete "hyrdoxy" and insert -- hydroxy --, therefor.

In column 3, line 62, delete "hyrdoxy" and insert -- hydroxy --, therefor.

In column 6, line 47, in Claim 5, delete "hyrdoxy" and insert -- hydroxy --, therefor.

In column 6, line 54, in Claim 6, delete "hyrdoxy" and insert -- hydroxy --, therefor.

In column 6, line 61, in Claim 7, delete "hyrdoxy" and insert -- hydroxy --, therefor.

In column 8, line 4, in Claim 21, delete "hyrdoxy" and insert -- hydroxy --, therefor.

In column 8, line 24, in Claim 22, delete "115° C." and insert -- 115° C., --, therefor.

Signed and Sealed this

Twenty-first Day of April, 2009

JOHN DOLL
*Acting Director of the United States Patent and Trademark Office*